United States Patent
Blomqvist et al.

[19]

[11] Patent Number: 5,859,415

[45] Date of Patent: Jan. 12, 1999

[54] METHOD AND APPARATUS FOR THE REGISTRATION OF A VEHICLE(S) IN A FREE FLOW TOLL FACILITY BY TRACKING THE VEHICLE ALONG A PATH IN THE TOLL FACILITY AREA

[75] Inventors: Kenneth Blomqvist, Jonkoping; Anders Hjelmare, Gränna; Lars Olsson, Jönköping, all of Sweden

[73] Assignee: Saab-Scania Combitech Aktiebolag, Jonkoping, Sweden

[21] Appl. No.: 553,514

[22] PCT Filed: May 27, 1994

[86] PCT No.: PCT/SE94/00504

§ 371 Date: Mar. 14, 1996

§ 102(e) Date: Mar. 14, 1996

[87] PCT Pub. No.: WO94/28516

PCT Pub. Date: Dec. 8, 1994

[30] Foreign Application Priority Data

May 28, 1993 [SE] Sweden ................................ 9301842
Sep. 30, 1993 [SE] Sweden ................................ 9303203

[51] Int. Cl.⁶ .................................................. G07B 15/02
[52] U.S. Cl. .......................... 235/384; 235/380; 235/382; 340/928; 340/941
[58] Field of Search ..................................... 235/375, 380, 235/382, 384; 340/928, 933, 937, 941

[56] References Cited

U.S. PATENT DOCUMENTS

| | | |
|---|---|---|
| 3,377,616 | 4/1968 | Auer, Jr. ............................. 235/384 X |
| 4,075,632 | 2/1978 | Baldwin et al. . |
| 4,104,630 | 8/1978 | Chasek . |
| 4,242,661 | 12/1980 | Henoch et al. . |
| 4,303,904 | 12/1981 | Chasek . |
| 4,368,979 | 1/1983 | Ruell ........................................ 356/71 |
| 4,555,618 | 11/1985 | Riskin . |
| 4,908,500 | 3/1990 | Baumberger ............................ 235/384 |
| 4,989,084 | 1/1991 | Wetzel .................................... 358/108 |
| 5,086,389 | 2/1992 | Hassett et al. ....................... 235/384 X |
| 5,144,553 | 9/1992 | Hassett et al. ....................... 235/384 X |
| 5,204,675 | 4/1993 | Sekine . |
| 5,253,162 | 10/1993 | Hassett et al. ....................... 235/384 X |
| 5,406,275 | 4/1995 | Hassett et al. ....................... 235/384 X |
| 5,422,473 | 6/1995 | Kamata .................................. 235/384 |
| 5,440,109 | 8/1995 | Hering et al. ........................... 235/384 |

FOREIGN PATENT DOCUMENTS

| | | |
|---|---|---|
| 60-10112A | 1/1985 | Japan . |
| 2-183389 | 7/1990 | Japan . |
| 2219881 | 12/1989 | United Kingdom . |
| WO90/14640 | 11/1990 | WIPO . |
| 91/20067 | 12/1991 | WIPO . |

*Primary Examiner*—Anita Pellman Gross
*Assistant Examiner*—Michael G. Lee
*Attorney, Agent, or Firm*—Irah H. Donner; Pepper Hamilton LLP

[57] ABSTRACT

A method registers a vehicle in a road toll facility that is provided with radio transmitter and receiver units (7). The radio transmitter and receiver units are configured to communicate with at least one vehicle unit (12) arranged in the vehicle (4). The vehicle unit is configured with radio transmitter-receiver equipment so that on receipt of a command from the radio transmitter unit (7) of the road toll facility, the vehicle unit communicates adequate data for performance of a debiting operation regarding a toll. Upon the entry of the vehicle into the toll facility area, the transmitter and receiver units (7) of the toll facility determine whether the vehicle (4) is equipped with a vehicle unit capable of performing a correct debiting transaction. The method distinguishes between vehicles for which the correct debiting can be performed and vehicles for which no debiting can be performed, and establishes a position for the vehicle by subjecting the vehicle to successive position measurements, and tracks the vehicle to a predetermined position where the license plate or other identifying characteristics of the vehicle that did not properly carry out a debiting operation is recorded for postdebiting of the toll.

11 Claims, 2 Drawing Sheets

METHOD AND APPARATUS FOR THE REGISTRATION OF A VEHICLE(S) IN A FREE FLOW TOLL FACILITY BY TRACKING THE VEHICLE ALONG A PATH IN THE TOLL FACILITY AREA

The present invention relates to a method and device for registering vehicles in a road toll facility. More specifically, the invention relates to a method and device in such road toll facilities, where fee debiting can take place through wireless transmission of radiowaves between vehicles and equipment in the road toll facility, respectively, and specially intended are such road toll facilities that are arranged to enable a free traffic flow through the toll facility.

BACKGROUND

It is known to arrange road toll facilities for automatic fee debiting, see for example U.S. Pat. No. 4,104,630 and U.S. Pat. No. 4,303,904.

Such systems to which the present invention refers, provide that the majority of vehicles that pass the toll facility, are provided with a receiver-transmitter unit for radiowaves. Usually microwaves are understood. The road toll facility comprises an arrangement by which communication by radiowaves can take place with passing vehicles. This arrangement comprises a transmitter and receiver, a transceiver, for the radiowaves by means of which equipment payment and debiting operations can be carried out for the passing vehicles provided with said reciever and transmitter unit, which unit usually has the form of a transponder. For this technique compare U.S. Pat. No. 4,075,632 and U.S. Pat. No. 4,242,661 for example.

However, it may occur, that the toll facility is passed by vehicles which are not provided with any receiver and transmitter equipment and therefore cannot be identified by means of the radiowaves. For identification of such vehicles, if these attempt at passing the toll facility without paying toll, the toll arrangement is provided with camera devices for image registration of the number plates of the vehicles in question for search and post-debiting.

The most advanced system for road tolls of this kind is adapted to a great flow of traffic in free formation. In such an arrangement it will be possible to for the vehicle to travel a certain distance from the time when a registration has been possible to carry out of whether the vehicle is identifiable through microwaves or not and until the recording operation regarding the number plate has been concluded.

During this displacement a separation must be maintained between such vehicles for which search and post-debiting shall take place, and such for which payment has been secured by means of the radio communication. This requires additionally that the toll arrangement is provided with an equipment for positioning detection also when the vehicles travel in free flow without determined lanes.

DESCRIPTION OF THE INVENTION

In the invention, it is described partly a method and partly a combination of device, which enable said detection and performance of payment operations for such vehicles which are provided with authorized equipment as well as registration by means of recording of the number plate of such vehicles for which no approved payment operation has been possible to perform during the passage through the toll facility. According to the invention, for the latter operation, the image recording by means of video cameras is utilized for the tracking of the vehicles for which a recording of the number plate shall be registered, so that safety is obtained that the same vehicle which on passing through the toll facility has been established to lack acceptable payment status can be connected with a registered recording before exiting the toll facility and thereby is assigned to the identity that was given to the vehicle on is entry.

DESCRIPTION OF THE DRAWINGS

In the accompanying drawings a preferred embodiment of the invention is illustrated, wherein.

PREFERRED EMBODIMENT

Figure 1:
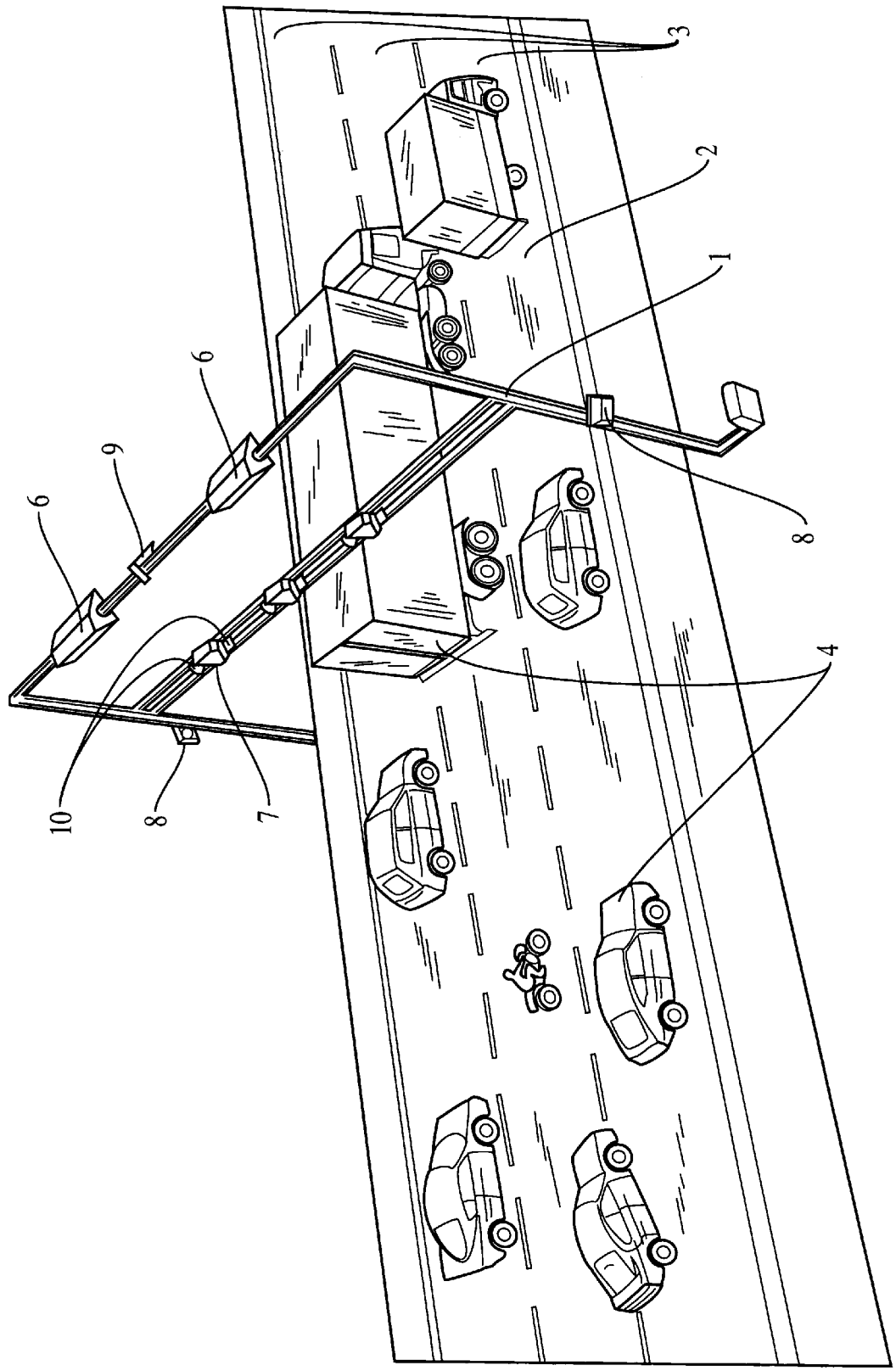
FIG. 1 shows in perspective a road toll arrangement.

According to FIG. 1 an automatic road toll facility according to the invention is provided with a support 1, which extends above a road 2, which has three lanes 3 in which vehicles 4 of different kinds can proceed through the portal-like gantry 1. The traffic is not limited to keeping the lanes under the gantry but is allowed to perform lane changes and over-takings. It is thus a free-flow system, which as little as possible shall disrupt the traffic flow.

On the gantry, there are attached two light fittings 6 and a number of transmitter and receiver units 7 for microwaves, three of which are shown here, including antennae for these. In addition, there is on either side a video camera 8, directed at the approaching traffic flow to register vehicles which unpermittedly are driven on the verge. In addition, at the top center of the gantry, video cameras 9 are shown. A a lower level, cameras are shown in three pairs of video cameras 10 directed forwards and backwards, respectively. These cameras are located approximately at the centre of the three lanes 3, respectively.

All this equipment is connected to a computer unit 11 for the control of same and for processing recorded data. This unit is in turn connected to a central net for further communication.

Figure 2:
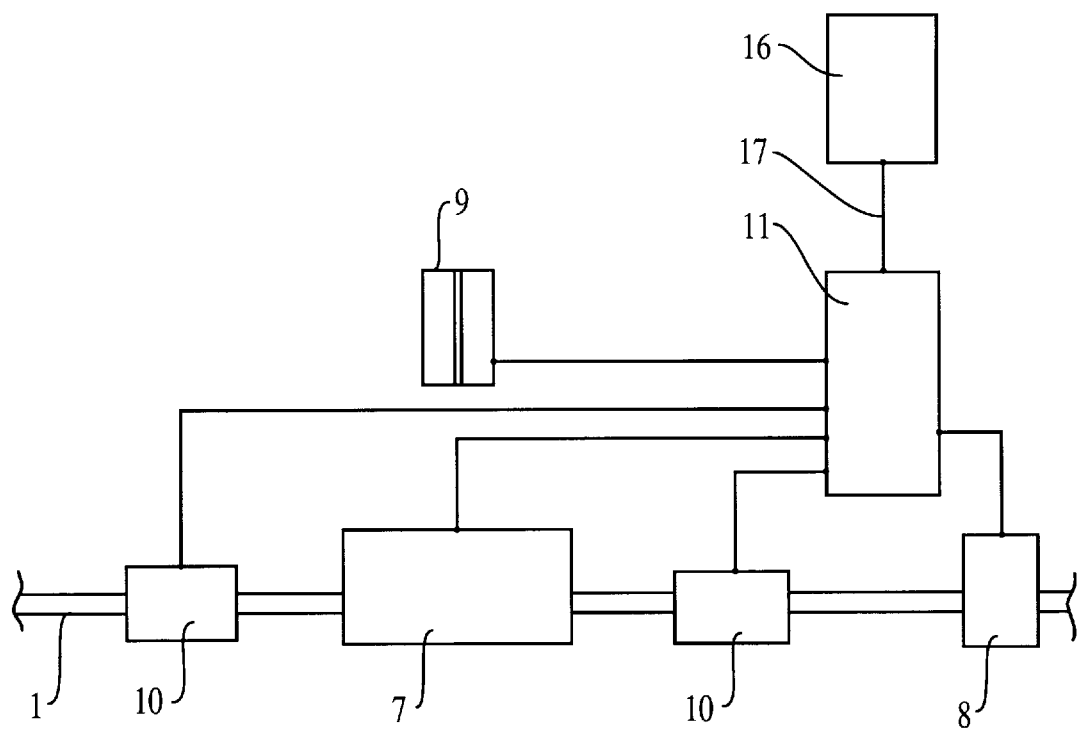
FIG. 2 shows a block diagram for the main element of function of the road toll system.
Figure 2:
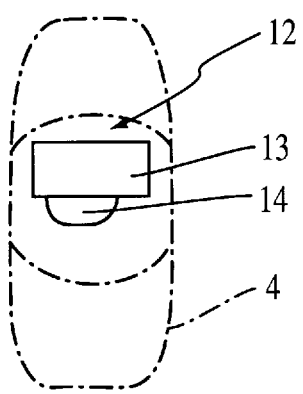

The main functions and function units of the arrangement are schematically represented in the block diagram in FIG. 2. Therein, 12 designates the equipment understood to be provided in the majority of vehicles 4.

Such an equipment is understood to be a transponder 13, which is arranged to pick up microwaves and transform them into an answer signal comprising information enabling a payment operation for the vehicle, and in addition, an intelligent card 14 for transmitting data via the transponder, which data, in addition to certain identification data, may consist of data regarding payment conditions (whether debiting shall occur or whether pre-payment via a pay card has been made).

Other elements in the block diagram relate to the stationary equipment. On the gantry there are located the transmitter and reciever equipment 7 for microwaves, video cameras 8 and 9 as well as the three pairs of video cameras 10 (only one pair of which is shown), which all are identified by the same numbers in the block diagram. Other elements belong to said equipment with which the equipment on the support communicates. This equipment can comprise said computer unit 11 for check the equipment and a central unit 16. The equipment for checking the vehicles which are not provided with any vehicle unit 12–14 with which payment can be ensured and for which there is a need for identification in another way, and examination for post-debiting, comprises the cameras 9 and 10 and belonging image processing computer which can be included in the unit 11. This unit is connected to the video cameras 9 for the registration of the position and displacement of the vehicles that shall be checked particularly. To the video cameras there are connected a unit for controlling the exposure of the vehicles whose number plate or other characteristic shall be registered, and a unit for collecting the registered video images and compression and storing of same. These images can via the unit 11 be communicated to the central arrangement 16 for post-proccessing in connection with search and post-debiting of vehicles that passed without paying. Finally, there is a communication unit 17 for communication with said central arrangement for the exchange of traffic information etc.

The vehicle equipment unit 12 comprises an apparatus in a box, which shall be attached for example at the windscreen of the vehicle. The box comprises a small, inbuilt transponder antenna, and interacting electronics, comprising a safety module. The apparatus box is furthermore provided with a character display and a summer.

The vehicle unit enables a double directed microwave communication with the toll facility trancievers 7, which are part of the fixed equipment. In addition, the vehicle unit is arranged to operate with a pre-paid card, smart card, which can be inserted in the apparatus box for payment of the road tolls.

Every owner of a vehicle within the area where road tolls are collected is provided with an identification card for the vehicle, which comprises all vehicle data necessary for the electronic toll system.

Pre-payment means that a customer has paid for a service or product before delivery of the service or product. Drivers who use a smart card or a pre-paid account intended for road tolls have subscribed to the pre-payment method. This method represents a convenient mode of payment for the user.

By the arrangement the fee is automatically subtracted from the remaining amount on the pre-paid card when the vehicle passes through an electronic toll station. To increase the debitable amount available, "money" can be transferred at a sales station.

The pre-payment card is the same size as a credit card. It comprises an integrated circuit with a microprocessor and a safety module. The safety module is a section designed to protect the data stored in the card. The manufacturer of such a smart card shall follow the highest international safety rules in the manufacturing process and in the construction of the integrated circuits. Such a smart card can store not only different kinds of information including electronic money, but also safety information against loss, damage and theft.

The vehicle driver inserts his card in the vehicle unit, which thereby indicates the remaining amount on the display. A certain predetermined amount is thereafter transferred automatically from the card to the safety module in the vehicle unit. Now, the vehicle unit is ready safely to perform a code controlled payment to the respective toll facility.

The summer in the vehicle unit is activated when payment has been made as an acknowledgement to the driver that the road toll has been paid at the electronic road toll facility.

The vehicle unit also includes a unique identification number. It is thus fully possible that tolls are drawn from an account related to the unique number of the vehicle unit. If desired, the vehicle unit can thus function completely without a smart card provided that the current identification number has been transmitted to the unit and stored in the safety module.

Drivers who have registered such a unique number for their vehicle unit can always choose to pay by using a pre-paid card or by drawing the toll from the account connected to the vehicle unit. It is essential to point out that the central system need not be informed of the mode of payment chosen. The driver can entirely decide at each time how he prefers to pay. If he wishes to pay with a smart card, he only inserts this card, which shall contain sufficient amount, into the vehicle unit. If he prefers not to use the card it is not inserted.

The mode of payment that is the safest and requires the least amount of data communication is pre-payment by means of a pay card. With current technique it is however not possible to perform a debiting on the pay card in the short time when the communication between the transponder and the transmitter-receiver equipment of the road toll facility occurs. According to a preferred embodiment, this problem is overcome in that, when a pay card is inserted into the vehicle communication equipment its content or a determined amount is loaded into a memory directly connected to the transponder, which memory can be included in the safety module. Hereby, the debiting operation can be carried out in the short time that is available.

Then, the procedure will be such that when the card is inserted into the vehicle equipment, a determined amount is transferred from the pay card to the transponder memory safety module. During use, a warning is given in the form of a light or sound signal when only a small predetermined amount remains stored in the memory. When the user removes the card, he is made aware of the possibilities, for example by means of a display, of re-feeding the money to the pay card within a specified period of time. An alternative to the above is that the payment transaction between the transponder and the pay card can be carried out after passage through the toll facility. Violation is dealt with at some subsequent toll station.

The pay card can be designed with an identification connected to a certain person or company, so that the amount fed into the transponder memory can be kept in reserve if for a time somebody else with his own pay card uses the vehicle. The pay card can be designed as an intelligent card (Smart Card) with memory and processing unit for other purposes than as a pay card only.

The vehicle can also be designed so that in its memory information is registered with regard to a number of the latest used pay cards/intelligent cards so that separate information on the transactions is safely recorded, in the event a card should be lost or become unusable. Correspondingly, an intelligent card can store information on identities in the toll facilities where debiting on the card has occurred.

The stationary equipment, the toll system, is arranged for communication between the vehicle equipment and the equipment in the road toll facility. The latter comprises in addition to other components, antennae with controlled range, a detector system for the vehicles, and the video system for recording vehicles that shall be registered particularly, and includes a computer system.

The antennas are required for communication with the vehicle units and for measuring their position. The video control system is necessary for detecting and tracking vehicles without vehicle units, as these vehicles are "invisible to the antennae". The video system is designed to record in video every vehicle that has not shown a correct payment status or has driven through the toll station without having been detected by means of radio communication. The computer system ensures processing of data in real-time including interaction of the electronic units, and also communication with the central facility, however not always in real-time.

The antennae with short range are mounted on the support 1 above the roadway. They emit microwaves, which activate the vehicle unit when this comes into the communication zone, that is within the operational range of the road toll facility. The activated vehicle unit answers by transmitting modulated waves, which are picked up by the antennae. Vehicles not provided with a vehicle unit with transponder are thus detected, and also the position of the vehicle is measured by means of a multi-antenna system. Vehicles that show correct payment at the current moment can therefore be selected out from other vehicles. Certain vehicles can however completely lack vehicle units while others do not have access to sufficient means of payment for the current situation, whether payment shall be made through a smart card or through a connected account. For the vehicles that have not shown a correct transaction, a video recording shall be registered before they leave the toll facility.

This recording system is needed to prevent that vehicles that have not fulfilled a correct payment operation leave the toll facility, without evidence having been secured by means of which legal measures can be taken. Consequently, every vehicle that has not fulfilled a correct payment, will be registered in the road toll facility by means of the video cameras for recording their identity. The image of the vehicle number plate of the presumptive rule violator is temporarily stored in compressed form in a mass storing memory in the computer system. Certain information, such as the kind of rule violation and the point of time when the vehicle is recorded, is stored together with the image. These data are transferred at a later, appropriate time as a greater amount of data to the central facility.

As mentioned, recording of vehicles that pass the road toll facility without being possible to identify for a correct payment operation, requires that after having established that such a vehicle has passed, it shall be identified through video recording of its number plate. This makes it necessary that the vehicle in question is tracked between the place in which the non-approved passage has been established and the place where recording takes place, so that no confusion between vehicles with authorized and vehicles with non-authorized passage occurs.

According to a preferred embodiment this is performed in the following way:

1. When a vehicle approaches the road toll facility this is indicated for "wakening" the apparatus in the road toll facility. This is effected by microwaves from the transmitter-receiver units 7.
2. The video detection equipment comprising the cameras 9 registers all the vehicles on their way in under the gantry 1. These cameras operate whereby with high contrast and give a clear contour for all the vehicles. These contour images are data processed and thereby an initial position for the vehicles that are recorded by the cameras can be established.
3. In connection with the indication, by means of the microwaves, that a vehicle is approaching and this in connection hereto is detected by the video detection equipment the vehicle is recorded by means of the cameras 10. In the embodiment shown in FIG. 1, first the front number plate is recorded by any of the cameras facing the traffic flow and after the vehicle has passed under the gantry and a distance away from it the rear number plate is recorded by one of the cameras turned in the direction of the traffic flow. The respective recordings are assigned to the vehicle that is located in recording position when the recordings are made, which is ensured in that the video detection equipment triggers the recording when the respective vehicle has been detected to be located in a determined recording site, which has been registered by this equipment.
4. The position of the vehicle is measured against the vehicle unit 12 by means of the transmitter-receiver equipment 7, which in each unit has three receiver elements. The phase position in the signal from the various elements are compared, by which the direction and position of the vehicle can be calculated. This position determination is related to the vehicle unit with its transponder being the measured object.
5. The payment operation is performed. Thereby, it is communicated on command from the microwave unit 7 in question in the toll facility, the amount and information related thereto such as time and the toll facility identity, which signal is to be picked up by the transponder and processed in the vehicle unit. Through modulation of the signal reflected from the transponder to the microwave transceiver in the toll station, it is indicated whether a correct payment operation has been performed.
6. The position determinations by means of the radiowaves from the receiver-transmitter equipment for vehicles with a transponder is processed together with the position determinations with the aid of the video detection equipment, that is the contour images. Thereby, a dialogue takes place between the two positioning systems.
7. Vehicles that have been identified with their transponder are registered further if correct payment conditions are at hand. As mentioned in the introduction, payment can be made in different ways, for example, through subtraction from a pay card in the vehicle via the transponder or other receiver-transmitter equipment or through debiting to an account agreed.

Through said measures there is now established a classification of the vehicles in three head classes:

Vehicles provided with a transponder for which a correct payment manouever can be performed;

Vehicles with a transponder but for which acceptable payment conditions are not at hand; and Vehicles without a transponder, which therefore cannot be detected by the transmitter-receiver equipment of the road facility.

As to the first class, these vehicles can pass without further measures and there is no interest in establishing the identity. Generally it is provided that the vehicles, for which correct payment operation can be performed, shall be anonymous with regard to the toll facility passage. Vehicles of the second class can, per se, be identified through the transponder, so that a post-debiting can occur if an approved payment condition should momentarily not be established, for example in that a pay card has not sufficient amount left or an account has been frozen. For vehicles of the third class, however, identification must take place through recording of the number plate. Vehicles of the second class can also be treated in this way as an alternative or complementary measure to identification via the transponder.

8. Those vehicles whose number plate shall be identified through recording by means of the cameras 10 shall now be tracked between the position where the recording is performed and the position where checking the payment status and in cases as may be if payment has been made. This position tracking occurs through data processing of the initial contour recording of the displacement within the recording field of the video contour cameras 9. This means that for every contour line or contract field used for the tracking, a number of related co-ordinates are registered, which represent the identity of the vehicle. In data processing the displacement of these co-ordinates within the image field can be tracked for new successive position designations.

9. When the respective vehicle has reached the place where the operation for checking the payment status and in cases as may be the payment operation have been performed, those recordings which have been assigned to vehicles for which the payment operation has been carried out are deleted. The identity of these vehicles can be determined through the dialogue between the equipment that by means of the radiowaves serves to perform the payment operation and that simultaneously by means of said antenna arrangement tracks the displacement of the vehicle with the aid of the vehicle transponder. This occurs in co-operation with the video detection equipment, which tracks the vehicles with great accuracy from the recording site to said point where the payment operation shall be concluded. For other vehicles, which have not fulfilled any payment, recording shall be registered together with data such as the identity of the toll facility and the time. If the vehicle has a transponder but in spite of this fact no approved payment operation has been performed, it can be tracked in the same way as described above. Vehicles which lack activatable transponder are, however, tracked only with the video detection equipment, and correct assignment of the recording and thereby the identity to data for the event can thus occur.

10. Recordings, which are obtained through the storing of the image recorded by the camera in the exposure position, for example in a video recorder or on a data disc, are now connected with the identification that is obtained by the aid of the momentary position in the moment of exposure for the co-ordinates that have been registered after having been produced in the image field of the video detection cameras 9. Consequently, a mutual data processing must be performed of the registration, which is obtained in the video cameras 10 through the recording and the location of the respective cameras, and the position determination, which is obtained through the video detection cameras 9 in conjunction with the microwaves when the vehicle has a transponder. Hereby, it is ensured that it is in fact a vehicle which unauthorizedly has passed the toll facility, whose number plate has been recorded. Hereby, it can be avoided that vehicles which authorizedly has passed the road facility, are exposed to search and post-debiting because of confusion with unauthorizedly passing vehicles, due to repositionings in the distance between the points where video recording takes place and where the checking/payment operation is concluded.

In the embodiment it is understood that all vehicles that pass into the operational range of the toll facility are recorded and that thereafter only those recordings are permanently registered which can be assigned to vehicles for which no correct payment operation has been performed. However, alternatively, it is possible to register only those vehicles for which no correct payment operation has been performed. Then, however, the recording must take place when the vehicle has passed the distance in which the microwave communication performs the check of the payment status. This point corresponds with the in section 9 above mentioned point in which according to the preferred embodiment the recordings that shall be permanently registered, are separated from those that shall be deleted.

Even if such an alternative is fully possible, it will mean that the equipment in the toll facility is divided in two arrangements, one with the equipment for the microwave communication and video detection equipment and a second with the recording equipment; in practice two gantry devices. From a constructional point of view the preferred embodiment will therefore be more advantageous and is therefore the embodiment preferred.

Even if it is here understood the recording of an image of the number plate or other characteristic, it does not exclude that recording can take place in any other way, for example through reading of the number code of the plate or other code.

It can be mentioned that in the preferred embodiment, the radio equipment does not need to track the displacement of the vehicle but only initially establish a position, which has been correlated to a corresponding position established by means of the video cameras. Thereafter, tracking can occur by means of the cameras only with identification of the vehicle on the basis of an identity alotted to it in the registering of the initial position.

In order to make certain that a contour of the respective vehicle detectable for the data processing can be registered by the video detection cameras, special arrangements can be of help. So, illumination can be used, preferably with IR light from suitable angles. Under certain conditions, it may be suitable to have supporting sensors such as magnetic loops, acoustic or optical arrangements.

It may be suitable to provide the roadway with a layer, which facilitates the contour determination, such as a white field or a grid of lines. An alternative is also to achieve a grid under or about the vehicles with the aid of a number of light sources.

It may be understood that for vehicles of different kinds, there are different fees such as higher fee for trucks than for passenger cars. It is thereby suitable that there is fed into the transponder data on fee class, so that correct debiting can occur. In order to counteract that any one informs an incorrect fee class or given other faulty information via the transponder, it may be appropriate to have checks in which the design of the vehicle is compared with the information from the transponder.

This is suitably effected by means of the video detection equipment and, which in such case is arranged to determine data regarding the height, width and length of the vehicle etc.

We claim:

1. Method for registering vehicles in a road toll facility, which is provided with radio transmitter and receiver units (7) the radio transmitter and receiver units are configured to communicate with vehicle units (12) arranged in the vehicles (4), the vehicle units being configured with radio transmitter-receiver equipment and configured so that on receipt of a command from the radio transmitter unit (7) of the road toll facility, the vehicle units communicate adequate data for performance of a debiting operation regarding a toll, characterized in that, on entry of at least one vehicle (4) into the toll facility area, detecting the vehicle by means of activation of at least one radio transmitter and receiver (7) when the vehicle (4) is provided with at least one vehicle unit (12) capable of performing a correct debiting operation, and logically separating from the vehicle at least another vehicle by determining that for the another vehicle a correct debiting operation cannot be performed and subjecting at least the another vehicle to a successive position determination by means of video cameras (9) and an image processing in which the vehicle is tracked between a position in a predetermined recording site, in which a number plate or other identifying characteristic of the another vehicle that did not correctly perform the debiting operation is recorded/read for identification and a position in which said determination of the presence of such another vehicle is performed, and which identification of the another vehicle is used for search and post-debiting of the toll.

2. Method according to claim 1, characterized in that, when the vehicle enters the toll facility area the radio-transmitter-receiver unit of the toll facility is activated to detect a first momentary position by measuring to the vehicle unit of the vehicle (12) and further detect said first position by means of position determination with the aid of the video cameras (9) and tracing, by means of the video cameras (9) and the image processing such vehicles which first position has been detected by means of a vehicle unit of the same, which is not provided to perform a correct debiting operation, to a position in said recording site, the result of the detecting operations being correlated to each other, for storing said recording and assigning it to the identity of the vehicle with the vehicle unit not provided to perform a correct debiting operation.

3. A system for registering vehicles in a road toll facility, the road toll facility includes with a radio transmitter and receiver equipment (7) configured to communicate with vehicle units (12) arranged in the vehicles (4) and including radio transmitter-receiver equipment and arranged so that on receipt of a command from the radio transmitter unit (7) of the road toll facility the vehicle unit communicates adequate data for performing a debiting operation regarding a toll, characterized in that the radio equipment (7) includes computer equipment configured to separate out the vehicles for which a correct debiting operation has been performed by means of the vehicle unit (12) from at least another vehicle from the vehicles for which the correct debiting operation has not been performed; and the device further comprises video cameras (9), image processing equipment connected to the video cameras, and means for recording a number plate or other representation of the vehicle identity, the image processing equipment being arranged, by means of the image recording of the video cameras (9), to track the vehicles (4) during their passage through the toll facility between an entry position using the means for recording and any point in the road toll facility in which the radio equipment (7) including the computer equipment is arranged to identify the vehicles for which the correct debiting operation has been performed, and additional means for storing recordings identifying the vehicles for which the correct debiting operation has not been performed, but said additional means configured not to perform the storing of the recordings of the vehicles for which the correct debiting operation has been indicated as performed.

4. A device according to claim 3, characterized in that the radio transmitter and receiver equipment (7) is arranged for detection of a first momentary position of the respective vehicles (4) by means of its vehicle unit (12) and arranged to transmit to the image processing equipment said first position of the vehicle and an indication to said storing means for storing the recording of the vehicle identity correlated to the vehicle, which by means of said tracking detected as present in said first momentary position and passing the recording site in the moment of recording the vehicle identity, in the case that a correct debiting operation has not been performed.

5. A method for administering a road toll facility with at least one vehicle traveling in a free traffic flow therethrough, comprising the steps of:

(a) determining when the vehicle approaches the road toll facility within a predetermined distance;

(b) determining a position for the vehicle using a first video camera as the vehicle travels in the road toll facility;

(c) identifying a number plate positioned on a visible area of the vehicle using a second video camera;

(d) assigning a recording unit to the vehicle responsive to the location of the vehicle when identified by the second video camera;

(e) determining the position and direction of the vehicle using the first recording unit as the vehicle travels in the road toll facility;

(f) correlating the position of the vehicle using the first video camera and the assigned recording unit;

(g) performing a debiting operation to collect a payment from the vehicle;

(h) determining whether the payment was received from the vehicle;

(i) classifying the vehicle in one of the following classes responsive to said determining step (h):
 (i1) vehicles for which the payment was received,
 (i2) vehicles provided with a transponder including transponder identification information for which the payment was not received, and
 (i3) vehicles without a transponder for which the payment was not received, (j) performing one of the following steps responsive to said classifying step (i):
 (j1) when the vehicle is classified in accordance with class (i1), allowing the vehicle to pass through the road toll facility without maintaining identification information relating to the vehicle,
 (j2) when the vehicle is classified in accordance with class (i2), tracking the vehicle using the first video camera as tracking information, and maintaining the transponder identification information and the tracking information for use in a later debiting operation,
 (j3) when the vehicle is classified in accordance with class (i3), tracking the vehicle using the first video camera as the tracking information, and maintaining the number plate and the tracking information for use in the later debiting operation;

(k) performing the later debiting operation when the vehicle is classified in either of classes (i2) or (i3).

6. A method for administering a road toll facility with at least one vehicle traveling in a free traffic flow therethrough, comprising the steps of:

(a) determining when the vehicle approaches the road toll facility within a predetermined distance;

(b) determining a position for the vehicle as the vehicle travels in the road toll facility;

(c) performing a debiting operation to collect a payment from the vehicle;

(d) determining whether the payment was received from the vehicle;

(e) classifying the vehicle in one of the following classes responsive to said determining step (d):
 (e1) vehicles for which the payment was received,
 (e2) vehicles provided with a transponder including transponder identification information for which the payment was not received, and
 (e3) vehicles without a transponder for which the payment was not received, (f) performing one of the following steps responsive to said classifying step (i):
  (f1) when the vehicle is classified in accordance with class (e1), allowing the vehicle to pass through the road toll facility without maintaining identification information relating to the vehicle,
  (f2) when the vehicle is classified in accordance with class (e2), tracking the vehicle as tracking information, and maintaining the transponder identification information and the tracking information for use in a later debiting operation,
  (f3) when the vehicle is classified in accordance with class (e3), tracking the vehicle as the tracking information including identifying a number plate positioned on a visible area of the vehicle, and maintaining the number plate and the tracking information for use in the later debiting operation;
(g) performing the later debiting operation when the vehicle is classified in either of classes (e2) or (e3).

7. A method for administering a road toll facility with at least one vehicle traveling in a free traffic flow therethrough, comprising the steps of:
  (a) determining when the vehicle approaches the road toll facility within a predetermined distance;
  (b) identifying a location of the vehicle and number plate positioned on a visible area of the vehicle;
  (c) assigning a recording unit to the vehicle responsive to the location of the vehicle when identified;
  (d) determining the position an d direction of the vehicle using the assigned recording unit as the vehicle travels in the road toll facility;
  (e) performing a debiting operation to collect a payment from the vehicle;
  (f) determining whether the payment was received from the vehicle;
  (g) classifying the vehicle in one of the following classes responsive to said determining step (f):
    (g1) vehicles for which the payment was received,
    (g2) vehicles provided with an identification unit including identification information for which the payment was not received, and
    (g3) vehicles without an identification unit for which the payment was not received,
  (h) performing one of the following steps responsive to said classifying step (g):
    (h1) when the vehicle is classified in accordance with class (g1), allowing the vehicle to pass through the road toll facility without maintaining identification information relating to the vehicle,
    (h2) when the vehicle is classified in accordance with class (g2), tracking the vehicle as tracking information, and maintaining the identification information and the tracking information for use in a later debiting operation,
    (h3) when the vehicle is classified in accordance with class (g3), tracking the vehicle as the tracking information, and maintaining the number plate and the tracking information for use in the later debiting operation;
  (i) performing the later debiting operation when the vehicle is classified in either of classes (g2) or (g3).

8. A method for registering a vehicle in a road toll facility, which is provided with radio transmitter and receiver units (7), the radio transmitter and receiver units are configured to communicate with at least one vehicle unit (12) arranged in the vehicle (4), the at least one vehicle unit being configured with radio transmitter-receiver equipment so that on receipt of a command from the radio transmitter unit (7) of the road toll facility, the vehicle unit communicates adequate data for performance of a debiting operation regarding a toll, characterized in that, on the entry of the vehicle into the toll facility area, the transmitter and receiver units (7) of the toll facility determine whether the vehicle (4) is equipped with the at least one vehicle units (12) capable of performing a correct debiting transaction, thus logically distinguishing between vehicles for which the correct debiting can be performed and vehicles for which no debiting can be performed, and establishing a position for the vehicle by subjecting the vehicle to a successive position measurement by means of video cameras (9) and image processing, tracking the vehicle to a predetermined identity securing position, at which the license plate or other identifying characteristics of the vehicle that did not properly carry out a debiting operation is recorded for storing of identification characteristics which are used for postdebiting the toll.

9. A method according to claim 8, characterized in that, when the vehicle (4) enters the toll facility area an initial position is determined both by measuring a first measurement to the at least one vehicle unit (12) through the radio transmitter and receiver units (7) and by measuring a second measurement with the aid of video cameras (9), and the first and second measurements are correlated with each other for the logical separation between vehicles with properly functioning vehicle units, for storing of the identifying characteristics of the vehicles without properly functioning vehicle units.

10. A method for registering a vehicle in a road toll facility, comprising the steps of:
  (a) detecting a first position of the vehicle when entering the road toll facility;
  (b) recording a representation of the vehicle by a first recording device;
  (c) assigning the representation of the vehicle to a communication device;
  (d) following the vehicle along a distance sufficient for the communication device to determine whether the vehicle is in one of the following classes:
    (d1) vehicles for which payment was received,
    (d2) vehicles provided with an identification unit including identification information for which payment was not received, and
    (d3) vehicles without an identification unit for which payment was not received,
  (e) recording vehicle identification information including a number plate or other identifying characteristic;
  (f) performing one of the following steps responsive to said following step (d):
    (f1) when the vehicle is classified in accordance with class (d1), allowing the vehicle to pass through the road toll facility without maintaining identification information relating to the vehicle,
    (f2) when the vehicle is classified in accordance with class (d2), tracking the vehicle as tracking information, and storing the vehicle identification information and the tracking information for use in a later debiting operation,
    (f3) when the vehicle is classified in accordance with class (d3), tracking the vehicle as the tracking information, and storing the number plate and the tracking information for use in the later debiting operation;

(g) performing the later debiting operation when the vehicle is classified in either of classes (d2) or (d3).

11. A method according to claim 10, wherein said recording step (b) and said tracking steps (f2) and (f3) ensure that said assigning step (c) correctly assigns the representation of the vehicle that is classified by said following step (d).

* * * * *